US012572881B2

(12) United States Patent (10) Patent No.: US 12,572,881 B2
Sawanami et al. (45) Date of Patent: Mar. 10, 2026

(54) CONTROL DEVICE, DELIVERY SYSTEM, CONTROL METHOD, AND DISPLAY PLATE

(71) Applicant: FUJI CORPORATION, Chiryu (JP)

(72) Inventors: Hisato Sawanami, Kariya (JP); Koji Kawaguchi, Kasugai (JP); Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 554 days.

(21) Appl. No.: 18/041,499

(22) PCT Filed: Aug. 24, 2020

(86) PCT No.: PCT/JP2020/031872
§ 371 (c)(1),
(2) Date: Feb. 13, 2023

(87) PCT Pub. No.: WO2022/044083
PCT Pub. Date: Mar. 3, 2022

(65) Prior Publication Data
US 2023/0306356 A1 Sep. 28, 2023

(51) Int. Cl.
*G06Q 10/083* (2024.01)
*B65G 1/04* (2006.01)
*B65G 1/137* (2006.01)

(52) U.S. Cl.
CPC ......... *G06Q 10/083* (2013.01); *B65G 1/0492* (2013.01); *B65G 1/1373* (2013.01)

(58) Field of Classification Search
CPC ........... G06Q 10/083; G06Q 10/06312; G06Q 10/08355; G06Q 10/087; G06Q 10/08;
(Continued)

(56) References Cited

U.S. PATENT DOCUMENTS 9,821,960 B2 11/2017 Issing
2005/0278063 A1* 12/2005 Hersh ................ G06Q 10/1097
700/216
(Continued)

FOREIGN PATENT DOCUMENTS

CN 105658547 A 6/2016
CN 107428461 A 12/2017
(Continued)

OTHER PUBLICATIONS

International Search Report issued Nov. 2, 2020 in PCT/JP2020/031872 filed on Aug. 24, 2020, 6 pages.

*Primary Examiner* — Justin Holmes
(74) *Attorney, Agent, or Firm* — Oblon, McClelland, Maier & Neustadt, L.L.P.

(57) ABSTRACT

A control device according to the present disclosure is used in a delivery system that uses a transporter for accommodating a carriage on which an article is loaded in a cargo chamber and delivering the carriage to deliver the article to an accommodation chamber in which multiple carriages are disposed. The control device includes a storage section configured to store correspondence information in which identification information on the article, identification information on the carriage on which the article is loaded, and information on a disposition position of the carriage disposed in the accommodation chamber are associated with each other, and a management control section configured to manage a movement of the article by using the correspondence information.

18 Claims, 9 Drawing Sheets

(58) Field of Classification Search
CPC ...... B65G 1/0492; B65G 1/1373; B65G 1/10;
B65G 1/04; B65G 67/02
See application file for complete search history.

(56) References Cited

U.S. PATENT DOCUMENTS

| | | | |
|---|---|---|---|
| 2016/0239799 A1 * | 8/2016 | Burch, V ................ | G01F 17/00 |
| 2017/0158431 A1 | 6/2017 | Hamilton et al. | |
| 2019/0062055 A1 | 2/2019 | Hance et al. | |

FOREIGN PATENT DOCUMENTS

| | | | | |
|---|---|---|---|---|
| CN | 107521400 A | | 12/2017 | |
| CN | 107646096 A | * | 1/2018 | ............. G06Q 10/08 |
| DE | 102019100063 A1 | * | 7/2019 | ......... G06Q 10/0836 |
| JP | 2018-147138 A | | 9/2018 | |
| WO | WO 2019/178172 A1 | | 9/2019 | |

* cited by examiner

CONTROL DEVICE, DELIVERY SYSTEM, CONTROL METHOD, AND DISPLAY PLATE

TECHNICAL FIELD

The present specification discloses a control device, a delivery system, a control method, and a display plate.

BACKGROUND ART

In the related art, as a control device used in a system for automatically moving an article, for example, a control device has been proposed as follow; the control device capable of accessing a topology configured to include a large number of waypoints and segments, providing an article-unique sequence or a distributed weighted transportation order, and transporting the article between a rack place and a starting location/destination (for example, refer to Patent Literature 1). In the control device, each transportation order has a route in a conveyance means level, displays linked segments, and along the segments, commodities move between a transfer place and the starting location/destination. In addition, as the control device, for example, a control device has been proposed as follows; multiple robots are deployed in each warehouse, and an inventory database of each warehouse is updated, based on messages transmitted by multiple robots in the warehouse while tasks are performed by the multiple robots in the warehouse (for example, refer to Patent Literature 2). Furthermore, the control device accepts an order, and for each warehouse, the control device determines an expected available time of an item satisfying an ordering party so that the expected available time can be used in collecting the articles in the warehouse, based on the inventory database of the warehouse. In addition, as an information processing system used in a system for automatically moving the article, for example, a system has been proposed; the system including an imaging section for imaging a commodity shelf, a movement section for moving at least one imaging section, a missing commodity detection section for detecting missing commodities based on an image of the commodity shelf imaged by at least one imaging section, and a conveyance section for conveying missing commodities detected by the missing commodity detection section from a back room into a shop (for example, refer to Patent Literature 3). In the system, commodity management can be more efficiently performed by automatically replenishing the commodity.

PATENT LITERATURE

Patent Literature 1: U.S. Patent Publication No. 9821960
Patent Literature 2: U.S. Unexamined Patent Publication No. 2019/62055
Patent Literature 3: JP-A-2018-147138

BRIEF SUMMARY

Technical Problem

Incidentally, in a system for delivering the article, for example, a carriage on which the article is loaded may be used. In this delivery system, multiple carriages are collected in a collection chamber of a delivery source, the carriages are carried into a conveyance vehicle, and are delivered to an accommodation chamber of a shop serving as a delivery destination. The carriage is disposed in front of an article display shelf in the accommodation chamber, and the article is moved to a display shelf. In this case, when the carriage is disposed in advance around a doorway of the accommodation chamber, there is a problem in that carrying-in work of the carriage is inefficient. An attempt to improve efficiency in the carrying-in work of the carriage has not been sufficiently considered by methods in the related art.

The present disclosure is made to solve the above-described problems, and a principal object according to the present disclosure is to provide a control device, a delivery system, a control method, and a display plate which can more efficiently carry out delivery work of an article.

The present disclosure adopts the following means to achieve the above-described principal object.

According to the present specification, there is provided a control device used in a delivery system that uses a transporter for accommodating a carriage on which an article is loaded in a cargo chamber and delivering the carriage to deliver the article to an accommodation chamber in which multiple carriages are disposed, the control device including a storage section configured to store correspondence information in which identification information on the article, identification information on the carriage on which the article is loaded, and information on a disposition position of the carriage disposed in the accommodation chamber are associated with each other; and a management control section configured to manage a movement of the article by using the correspondence information.

In the control device, the movement of the article is managed by using the correspondence information in which the identification information on the article, the identification information on the carriage on which the article is loaded, and the information on the disposition position of the carriage disposed in the accommodation chamber are associated with each other. In the control device, since the article, the carriage, and the disposition position are managed in association with each other, delivery work of the article can be more efficiently carried out. Here, the "article" is not particularly limited as long as anything is delivered, and for example, examples of the "article" include industrial products including units and components of machines or devices, general consumer products, foods, and fresh products. In addition, for example, examples of the "accommodation chamber" include a logistics center, a warehouse, and a shop in which the articles are collected. In addition, examples of the transporter include a vehicle such as an automobile and a train, a ship, and an aircraft.

DESCRIPTION OF EMBODIMENTS

Figure 1:
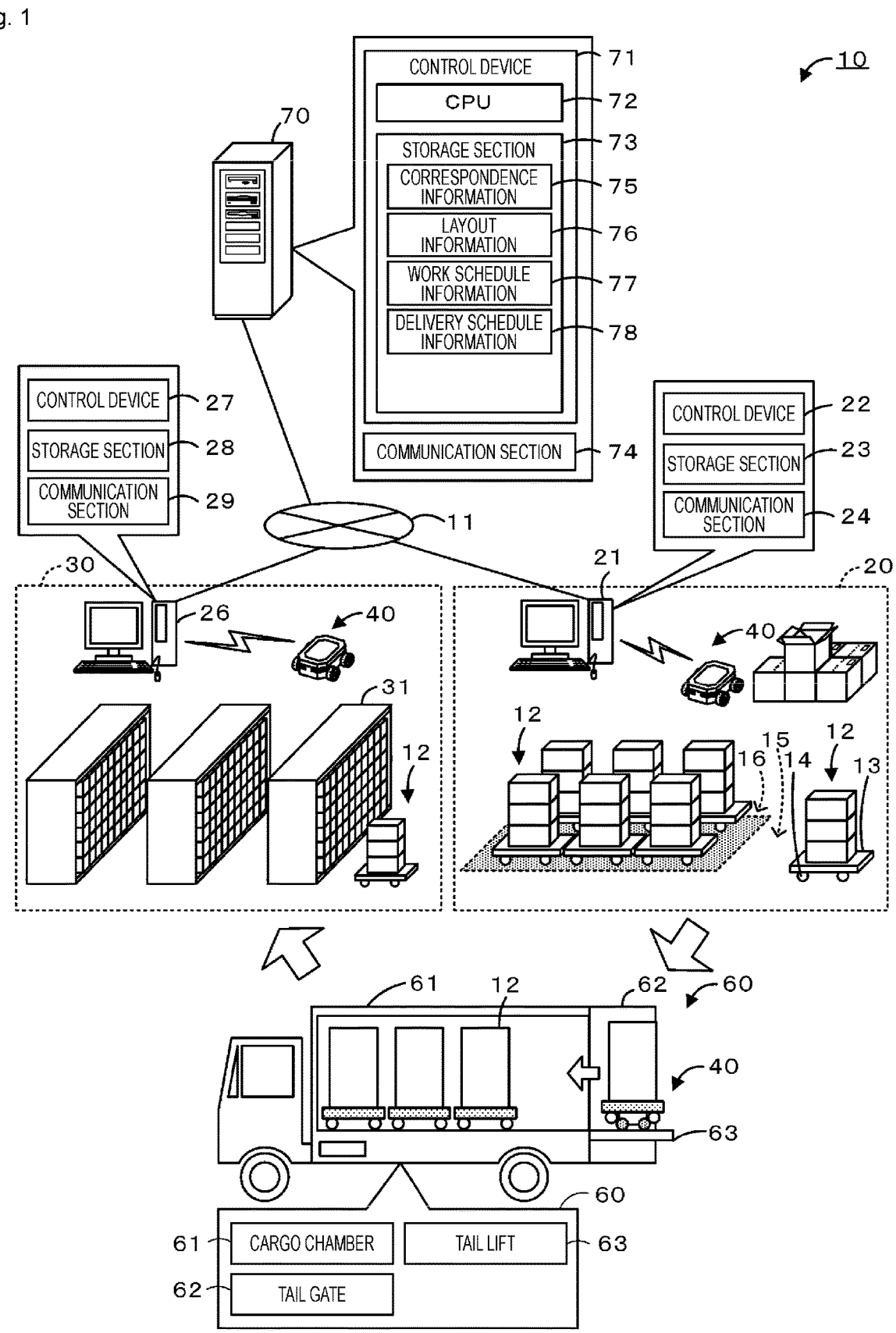
FIG. 1 is a schematic explanatory view illustrating an example of delivery system 10.
Figure 2:
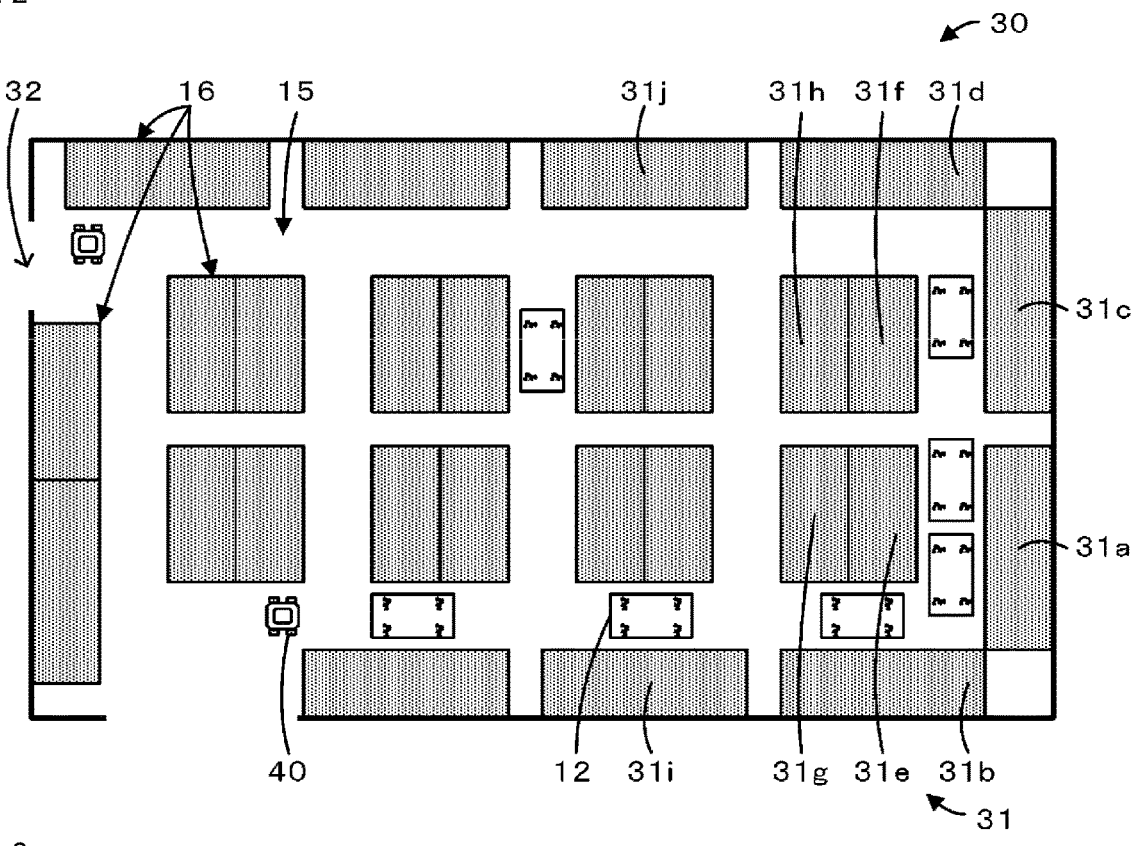
FIG. 2 is an explanatory view illustrating an example of shop 30.
Figure 3:
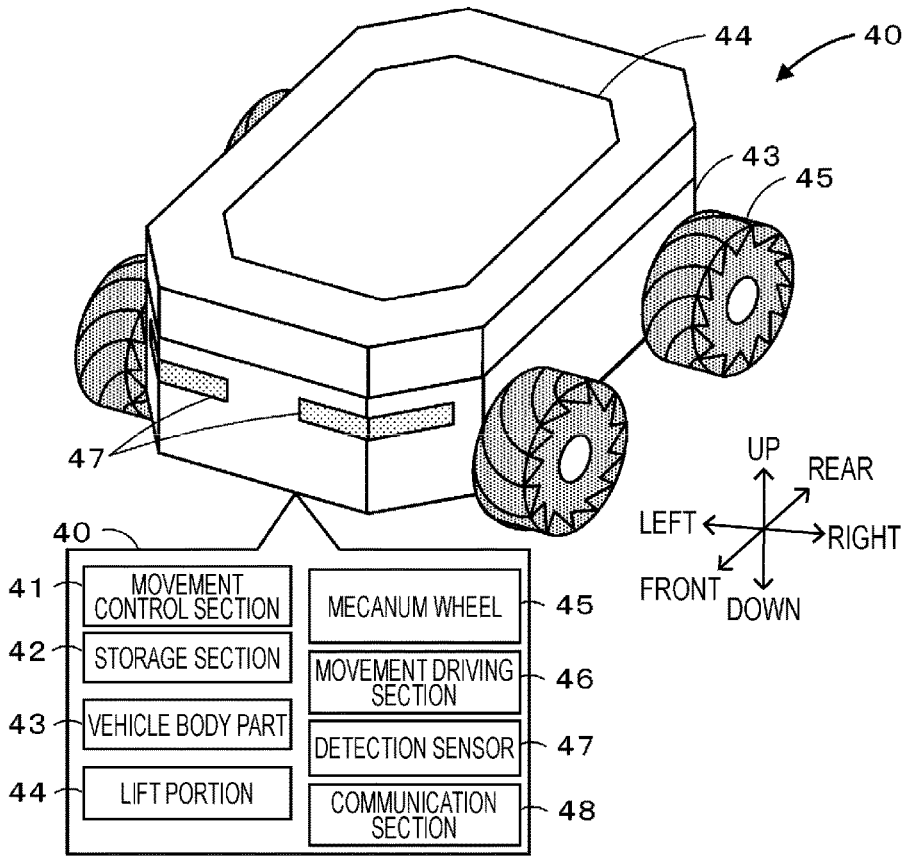
FIG. 3 is an explanatory view illustrating an example of automatic movement device 40.
Figure 4A:
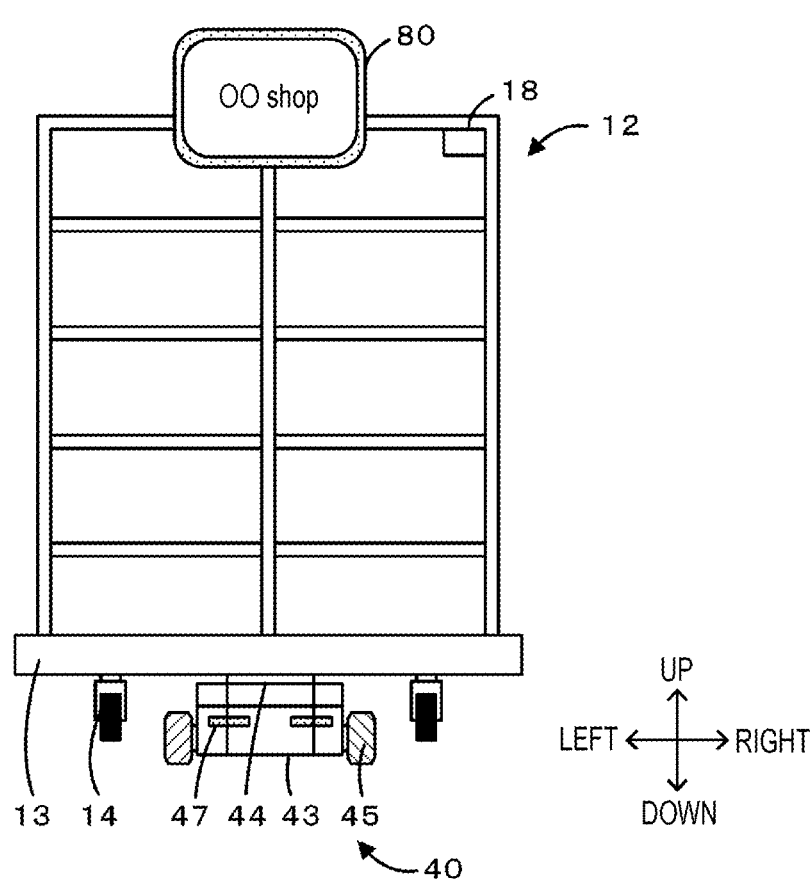
FIGS. 4a and 4b are explanatory views of automatic movement device 40 and display plate 80 connected to carriage 12.
Figure 4B:
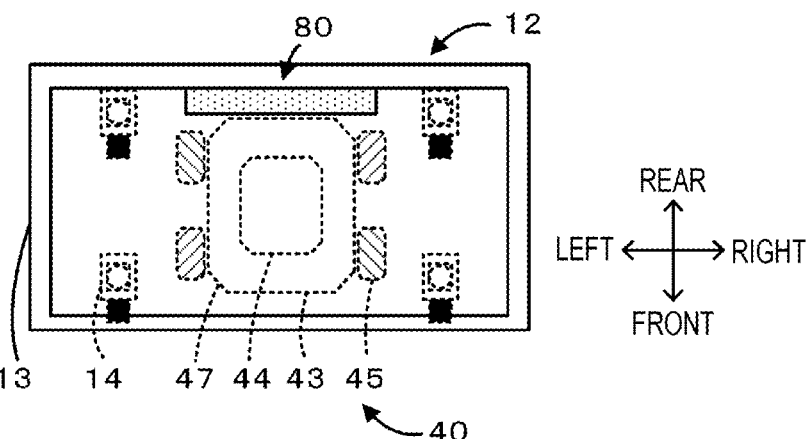
Figure 5:
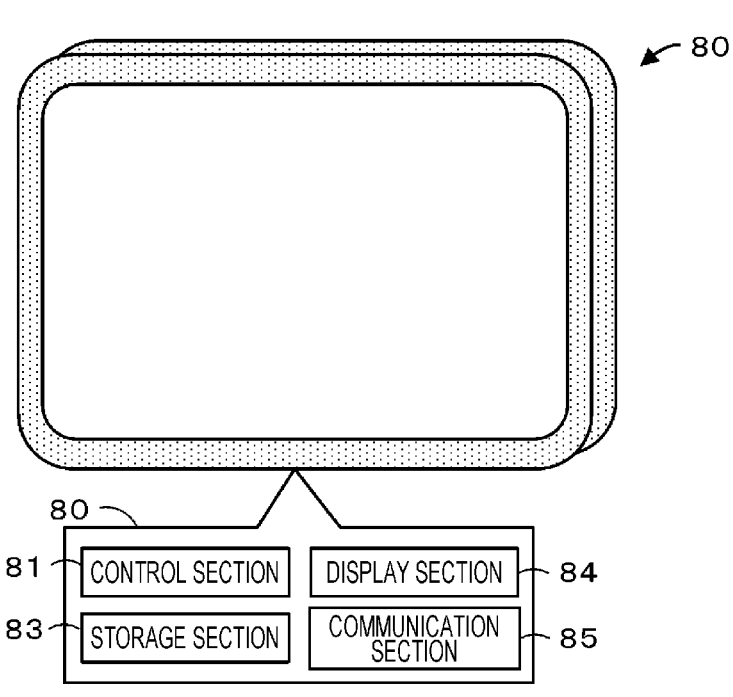
FIG. 5 is an explanatory view illustrating an example of display plate 80.
Figure 6:
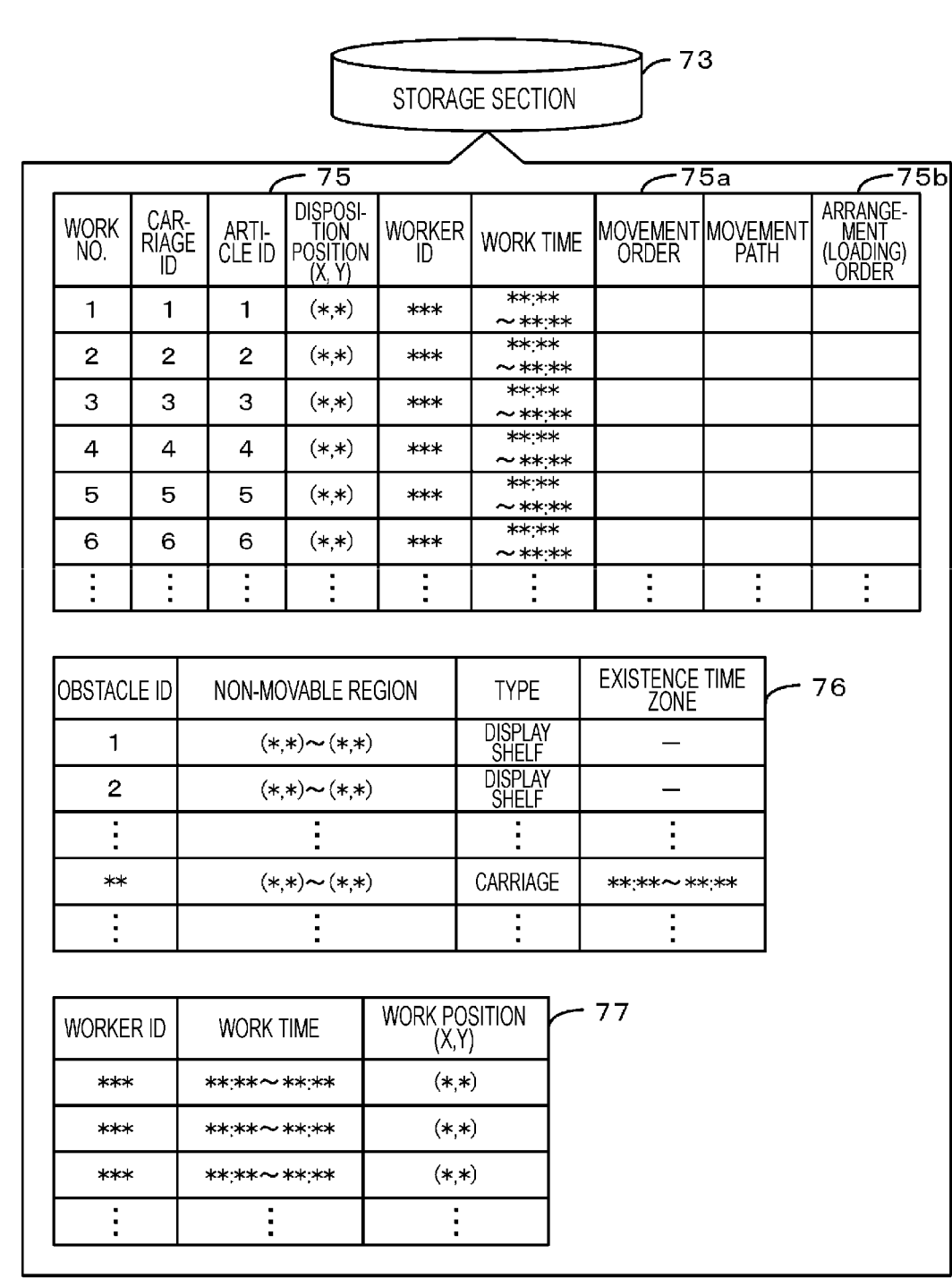
FIG. 6 is an explanatory view illustrating an example of information stored in storage section 73.

Embodiments according to the present disclosure will be described with reference to the drawings. FIG. 1 is a schematic explanatory view illustrating an example of delivery system 10. FIG. 2 is an explanatory view illustrating an example of shop 30. FIG. 3 is an explanatory view illustrating an example of automatic movement device 40. FIGS. 4a and 4b are explanatory views of automatic movement device 40 and display plate 80 connected to carriage 12. FIG. 5 is an explanatory view illustrating an example of display plate 80. FIG. 6 is an explanatory view illustrating an example of correspondence information 75, layout information 76, and work schedule information 77 which are stored in storage section 73. Delivery system 10 is a system for delivering an article to an accommodation chamber in which multiple carriages 12 are disposed by using a transporter for accommodating carriages 12 on which the article is loaded in a cargo chamber and delivering carriages 12. Here, the "article" is not particularly limited as long as anything is delivered, and for example, examples of the "article" include machines, devices, industrial products including units and components of devices, generally used daily consumer products, foods, and fresh products. In addition, examples of the transporter include a vehicle such as a train, a ship, and an aircraft in addition to delivery vehicle 60. In addition, examples of the "accommodation chamber" include logistics center 20, a warehouse, and shop 30 in which the articles are collected. Here, for convenience of description, delivery system 10 for delivering commodities such as consumer commodities and fresh commodities by delivery vehicle 60 from logistics center 20 serving as a delivery source to shop 30 serving as a delivery destination will be mainly described. In the present embodiment, a left-right direction, a front-rear direction, and an up-down direction will be described as illustrated in each drawing.

Carriage 12 includes loading section 13 and caster 14. Loading section 13 is a plate-shaped member for loading the article. Caster 14 has wheels for causing carriage 12 to travel, and is disposed on a lower surface side of loading section 13. Carriage 12 may be a basket carriage. In addition, identification information (ID) for identifying carriage 12 is assigned to carriage 12. Carriage 12 is provided with RFID 18 (refer to FIGS. 4a and 4b), and is configured to be able to receive carriage ID by a receiver. In addition, in an upper part of carriage 12, display plate 80 for displaying a delivery destination of carriage 12 is disposed to be detachable (refer to FIGS. 4a and 4b).

Logistics center 20 is a place for collecting the articles and delivering the articles to shops 30 or other logistics centers 20 in various locations. Logistics center 20 has one or more automatic movement devices 40, and can automatically move carriage 12. For example, logistics center 20 uses a specific region on a floor surface as a collection region corresponding to the delivery destination. In logistics center 20, a worker or an arm robot (not illustrated) carries out work for loading the article on carriage 12 corresponding to the delivery destination. As illustrated in FIG. 2, logistics center 20 includes movable region 15 in which automatic movement device 40 is movable and non-movable region 16 in which automatic movement device 40 is not movable. For example, non-movable region 16 includes a structure such as a column which nothing can physically enter, and a collection region of carriage 12.

Shop 30 displays and sells delivered articles. Shop 30 has one or more automatic movement devices 40, and carriage 12 can be automatically moved. As illustrated in FIG. 2, shop 30 has display shelf 31 on which the articles are displayed, and a worker displays the articles on display shelf 31. Shop 30 has doorway 32, and the articles are moved between carriage 12 and delivery vehicle 60 via doorway 32. Multiple display shelves 31a to 31j are disposed in shop 30. Here, display shelves 31a to 31j are collectively referred to as display shelf 31, and carriages 12a to 12i (FIG. 9) are collectively referred to as carriage 12. In shop 30, display shelf 31 and disposed carriage 12 are in non-movable region 16, and the other paths are in movable region 15.

As illustrated in FIG. 1, delivery system 10 includes logistics PC 21, shop PC 26, automatic movement device 40, and management server 70. Logistics PC 21 is disposed in logistics center 20, and performs commodity management in logistics center 20. Logistics PC 21 includes control device 22, storage section 23, and communication section 24. Control device 22 has a CPU, and controls the whole device. Storage section 23 stores various application programs and various data files. Storage section 23 stores the same information as correspondence information 75, layout information 76, work schedule information 77, and delivery schedule information 78 which will be described in detail later. Communication section 24 communicates with an external device such as automatic movement device 40. In addition, communication section 24 exchanges information with management server 70 or shop PC 26 via network 11.

Shop PC 26 is disposed in shop 30, and performs commodity management in shop 30. Shop PC 26 includes control device 27, storage section 28, and communication section 29. Control device 27 has a CPU, and controls the whole device. Storage section 28 stores various application programs and various data files. Storage section 28 stores the same information as correspondence information 75, layout information 76, work schedule information 77, and delivery schedule information 78 which will be described in detail later. Communication section 29 communicates with an external device such as automatic movement device 40. In addition, communication section 29 exchanges information with management server 70 or logistics PC 21 via network 11.

Automatic movement device 40 is a vehicle that automatically moves carriage 12. Automatic movement device 40 carries out work for collecting, loading, and unloading carriage 12 for which a delivery destination is specified. Automatic movement device 40 enters a space formed with caster 14 on a lower surface side of loading section 13 of carriage 12, connects loading section 13 to carriage 12 by lifting loading section 13 from below with lift portion 44, and moves carriage 12. Automatic movement device 40 may be an automatic guided vehicle (AGV) that moves on a predetermined traveling road, or may be an autonomous mobile robot (AMR) that moves on a free route by sensing surroundings. Here, an automatic movement device 40 having a configuration of the AMR will be described.

As illustrated in FIGS. 3, 4a, and 4b, automatic movement device 40 includes movement control section 41, storage section 42, vehicle body part 43, lift portion 44, mecanum wheel 45, movement driving section 46, detection sensor 47, and communication section 48. Movement control section 41 is a controller for controlling the whole device of automatic movement device 40. Movement control section 41 outputs a control signal to lift portion 44, movement driving section 46, or communication section 48, and inputs an input signal from detection sensor 47 and communication section 48. Movement control section 41 recognizes a movement direction, a movement distance, a current position of automatic movement device 40, based on a drive state of movement driving section 46. Storage section 42 stores various application programs and various data files. For example, storage section 42 stores schedule information including a schedule of carriage 12, a usage map inside the accommodation chamber. Lift portion 44 is connected to carriage 12 by pushing a lower surface of loading section 13 upward with respect to vehicle body part 43 of automatic movement device 40 (refer to FIGS. 4*a* and 4*b*). Mecanum wheel 45 has a structure in which multiple rollers pivotally supported to be freely rotatable at an inclination angle of 45° with respect to a vehicle axle are disposed on a grounding surface side. Automatic movement device 40 includes four mecanum wheel 45, and is configured to be capable of moving automatic movement device 40 in all directions, super-fuzzy terrain turning, fuzzy terrain turning, slow turning by independently rotating respective mecanum wheels 45 in a front direction or a rear direction. Movement driving section 46 is a motor connected to respective mecanum wheels 45 and rotationally driving connected mecanum wheel 45 to drive automatic movement device 40 to travel. Detection sensor 47 detects an object existing around automatic movement device 40 or a distance from the object. For example, detection sensor 47 detects the existence of the object or the distance from the object by irradiating the surroundings with light such as a laser, or a sound wave and detecting a reflected wave. Movement control section 41 controls automatic movement device 40 to move or stop, based on information from detection sensor 47. Communication section 48 wirelessly exchanges information with an external device such as logistics PC 21 and shop PC 26. Movement control section 41 moves to a position of carriage 12, based on a command obtained from logistics PC 21 via communication section 48, is connected to carriage 12, and thereafter, moves carriage 12 to a disposition position of a movement destination along a set movement path.

Display plate 80 is attached to carriage 12, and has a function of an electronic bulletin board for displaying information on a delivery destination of carriage 12. As illustrated in FIG. 5, display plate 80 includes control section 81, storage section 83, display section 84, and communication section 85. Control section 81 has a CPU, and controls the whole device. Storage section 83 stores various application programs and various data files. Storage section 83 stores information on the delivery destination of carriage 12 to be attached. Display section 84 is a touch panel type display, can input various information, and can display and output images such as icons, symbols, and characters. Communication section 85 communicates with an external device such as logistics PC 21 and shop PC 26. In addition, communication section 85 has a function as an acquisition section for acquiring identification information (carriage ID) from RFID 18 disposed in carriage 12 in a contactless manner, and a function as a transmission section for transmitting the acquired information. In addition, display plate 80 also has a function of acquiring a current position and transmitting the acquired current position to an external device such as logistics PC 21 and shop PC 26.

Delivery vehicle 60 is a vehicle that loads and delivers one or more carriages 12. Delivery vehicle 60 loads carriage 12 on cargo chamber 61 in logistics center 20, delivers the article to shop 30 serving as the delivery destination, and thereafter, returns empty carriage 12 to logistics center 20.

As illustrated in FIG. 1, delivery vehicle 60 includes cargo chamber 61, tail gate 62, and tail lift 63. Cargo chamber 61 is a space for loading carriage 12. Tail gate 62 is provided in a rear part of a vehicle, and opens and closes cargo chamber 61 by a closing door. Tail lift 63 loads carriage 12 or a worker on a work table which is horizontal when the closing door is opened, and moves the work table up and down between a floor surface of cargo chamber 61 and a traveling surface of delivery vehicle 60. In the present embodiment, although carriage 12 is delivered by delivery vehicle 60 of a truck, the configuration is not particularly limited to this, and may be delivered by a transporter such as a train, a ship, an aircraft.

Management server 70 is a device that manages delivery system 10. Management server 70 includes control device 71, storage section 73, and communication section 74. Control device 71 includes CPU 72, and controls the whole device. Storage section 73 stores various application programs and various data files. Storage section 73 stores correspondence information 75, layout information 76, work schedule information 77, delivery schedule information 78. Correspondence information 75 is information used in logistics center 20 or shop 30, and for example, as illustrated in FIG. 6, correspondence information 75 is information in which identification information on the article (article ID), identification information on carriage 12 on which the article is loaded (carriage ID), and information on a disposition position of carriage 12 disposed in the accommodation chamber are associated with each other. The disposition position is defined as a coordinate of a final delivery destination, and for example, the disposition position includes a position in front of display shelf 31 of shop 30 where commodities loaded on carriage 12 are displayed. Additionally, in correspondence information 75, identification information (worker ID) of a work vehicle moving the article from carriage 12 to display shelf 31, a work time at which a worker unloads the article are also associated with the carriage ID. In addition, in correspondence information 75, movement order information 75*a* indicating a movement order of carriages 12 in shop 30, a movement path of carriages 12 inside shop 30, arrangement order information 75*b* indicating an arrangement order for loading carriages 12 on delivery vehicle 60 are also associated with the carriage IDs. Layout information 76 is information including movable region 15 and non-movable region 16 of carriage 12 inside shop 30 serving as the accommodation chamber. In layout information 76, identification information on an obstacle (obstacle ID) serving as non-movable region 16 of carriage 12, and information on a region occupied by the obstacle (non-movable region 16), a type, or an existence time zone when the obstacle is movable are associated with each other. For example, examples of the type of the obstacle include movable carriage 12 in addition to display shelf 31. Non-movable region 16 also includes a carriage region in which movable carriage 12 is disposed. Work schedule information 77 is information including a schedule of a worker who carries out unloading work of the article on carriage 12 in logistics center 20 or shop 30 serving as the accommodation chamber. In work schedule information 77, identification information on the worker (worker ID), a work time in the accommodation chamber of the worker, a position (coordinate) for carrying out the work are associated with each other. For example, the work position in shop 30 may correspond to specific display shelf 31. Delivery schedule information 78 is a schedule table in which a type or the number of the articles to be delivered from the delivery source to the delivery destination, information on the delivery source, and the information on the delivery destination are associated with each other. Based on delivery schedule information 78, correspondence information 75 is prepared.

Figure 7:
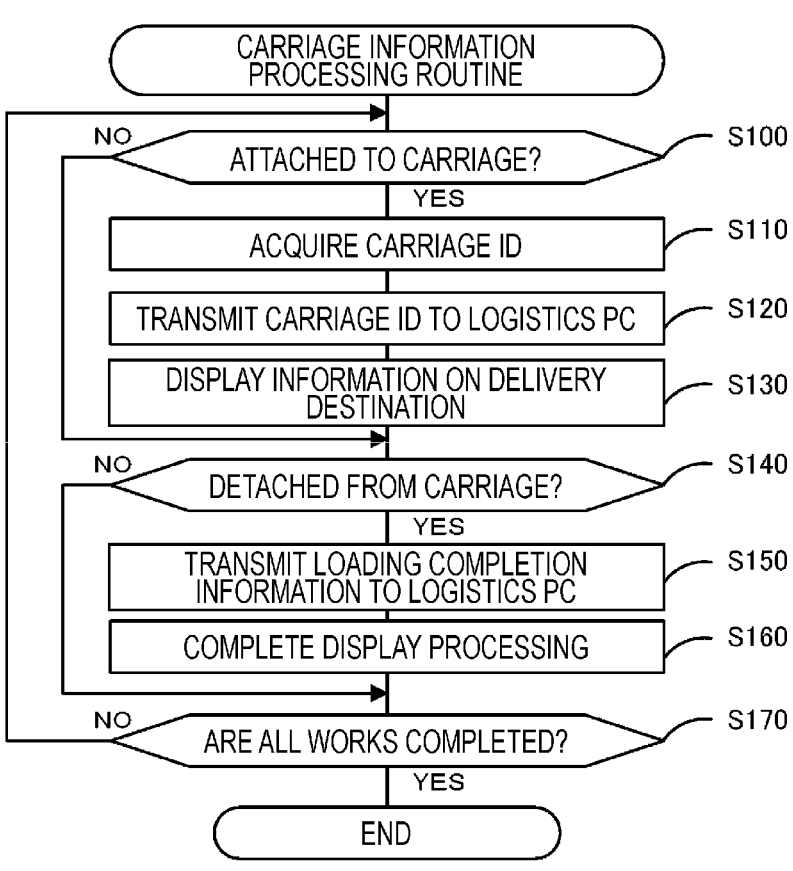
FIG. 7 is a flowchart illustrating an example of a carriage information processing routine.

Next, in delivery system 10 configured in this way, processing of preparing carriage 12 by using display plate 80 in logistics center 20 will be described. FIG. 7 is a flowchart illustrating an example of a carriage information processing routine performed by control section 81 of display plate 80. The routine is stored in storage section 23 of control device 22, and is performed after a power source of display plate 80 is turned on. When the routine starts, control section 81 determines whether display plate 80 is attached to carriage 12 (S100). Control section 81 can determine whether communication section 85 receives a radio wave from RFID 18. When display plate 80 is attached to carriage 12, control section 81 acquires the carriage ID from RFID 18 (S110), and transmits the acquired carriage ID to logistics PC 21 (S120). Logistics PC 21 receiving the carriage ID causes storage section 23 to store correspondence information in which the information on the delivery destination of carriage 12, carriage 12, and the article loaded by carriage 12 are associated with each other, and transmits the correspondence information to management server 70. After S120, control section 81 causes display section 84 to display the information on the delivery destination (S130). The worker confirms the display on display section 84, and loads the article on carriage 12. When the loading of the article on carriage 12 is completed, the worker moves carriage 12 to a collection region of the delivery destination, and detaches display plate 80 from carriage 12. Automatic movement device 40 may move carriage 12, and the worker may detach display plate 80 in the collection region.

After S130 or when display plate 80 is attached to carriage 12 in S100, control section 81 determines whether display plate 80 is detached from carriage 12 (S140). When display plate 80 is detached from carriage 12, control section 81 transmits loading completion information to logistics PC 21 by determining that loading of the article on carriage 12 is completed (S150), and completes processing of displaying the delivery destination on display section 84 (S160). Logistics PC 21 receiving the loading completion information outputs a movement command to automatic movement device 40 to move loading completed carriage 12 to cargo chamber 61 of delivery vehicle 60. Automatic movement device 40 moves carriage 12 to cargo chamber 61. After S160 or when display plate 80 is not detached from carriage 12 in S140, control section 81 determines whether all works of display plate 80 are completed (S170), and when all works are not completed, control section 81 repeatedly performs the processes subsequent to S100. On the other hand, when all works are completed in S170, the routine is completed. In this way, in delivery system 10, since display plate 80 automatically reads the carriage ID, the works of the worker are reduced.

Figure 8:
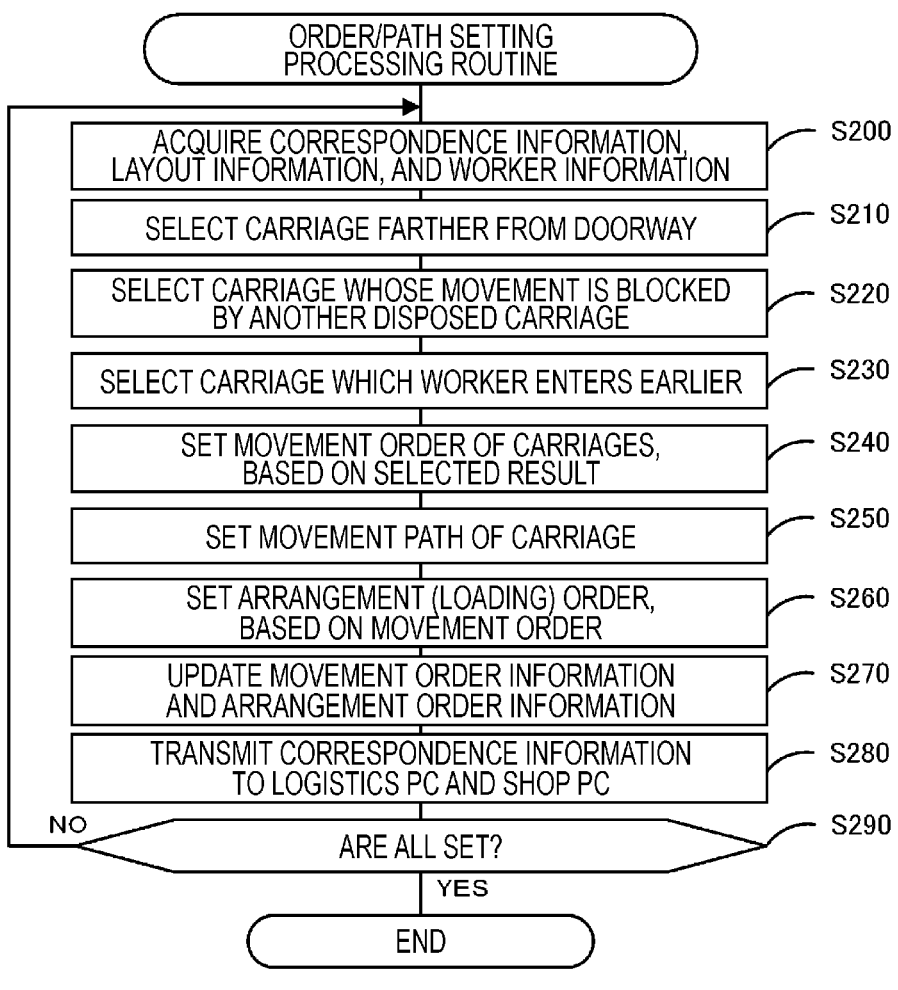
FIG. 8 is a flowchart illustrating an example of an order path setting processing routine.

Next, processing of setting an arrangement order in which management server 70 moves carriage 12 to cargo chamber 61 of delivery vehicle 60, and a movement order or a movement path when carriage 12 is moved to the disposition position serving as a destination in shop 30 will be described. FIG. 8 is a flowchart illustrating an example of an order path setting processing routine performed by CPU 72 of management server 70. The routine is stored in storage section 73 of control device 71, and is performed before carriage 12 is loaded on delivery vehicle 60. When the routine starts, CPU 72 of control device 71 reads and acquires correspondence information 75, layout information 76, and work schedule information 77 from storage section 73 (S200). Next, out of carriages 12 to be loaded on cargo chamber 61, CPU 72 selects carriage 12 to be moved to a disposition position farther from doorway 32 in shop 30 (S210). Next, CPU 72 selects carriage 12 whose movement is obstructed when another carriage 12 is disposed at the disposition position (S220). Next, CPU 72 selects carriage 12 on which the article to be placed on display shelf 31 assigned to the worker who enters shop 30 earlier is loaded (S230).

Figure 9:
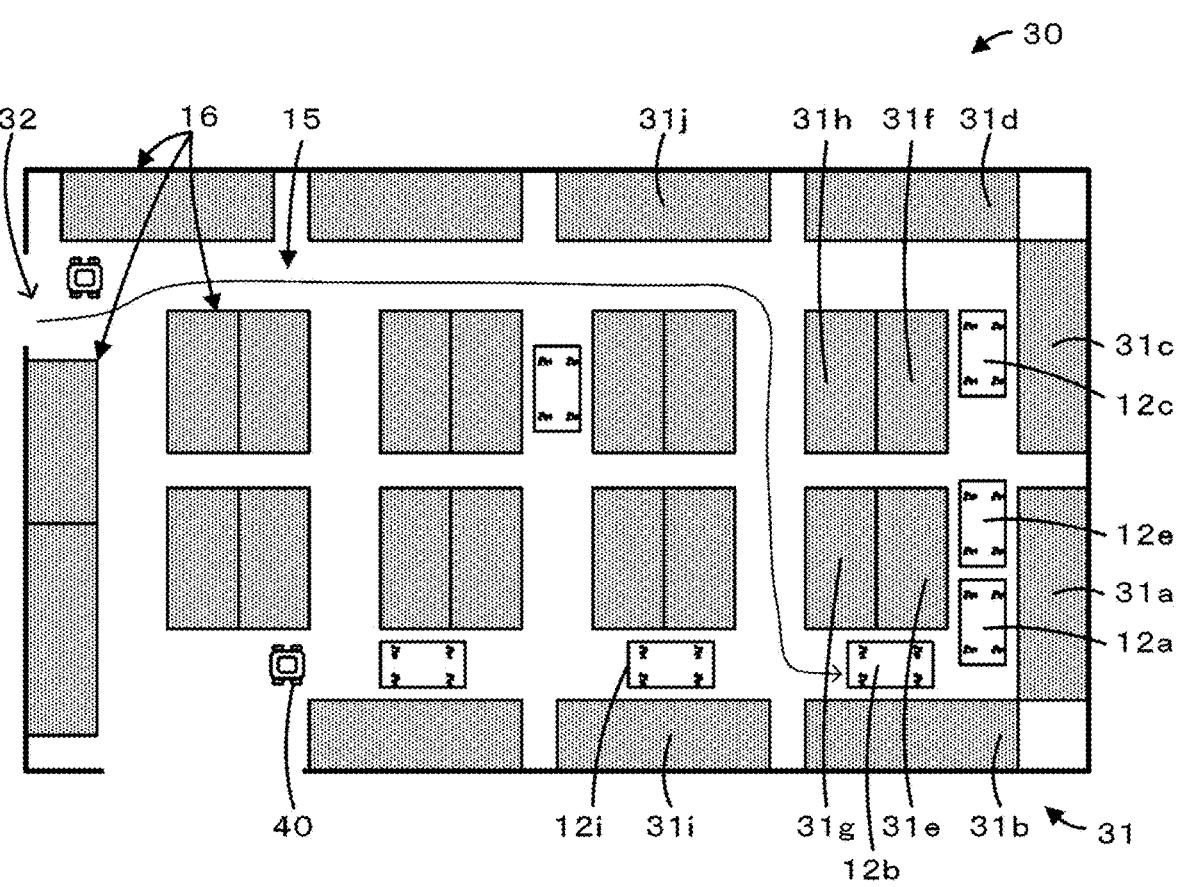
FIG. 9 is an explanatory view for setting a suggested route and a path in shop 30.

FIG. 9 is an explanatory view for setting a suggested route and a path in shop 30. Processes in S210 to S230 will be described by using display shelves 31a to 31j and carriages 12a to 12i in FIG. 9. In shop 30, display shelf 31a displays the article of carriage 12a, display shelf 31b displays the article of carriage 12b, display shelf 31c displays the article of carriage 12c, and display shelf 31e displays the article of carriage 12e. In S210, for example, CPU 72 selects carriage 12 in the order of carriages 12a, 12b, 12e, and 12c by determining that the carriages move to the disposition position farther from doorway 32. In addition, in S220, for example, CPU 72 selects carriage 12 such as carriages 12a and 12e by determining that the movement is obstructed. The reason is that carriage 12a cannot move to the disposition position when carriage 12b or carriage 12e is disposed earlier, and carriage 12e cannot move to the disposition position when carriages 12a, 12b, or carriage 12c are disposed earlier. In addition, for example, CPU 72 selects carriage 12i by determining that carriage 12i is assigned to the worker who enters shop 30 earlier.

After S230, CPU 72 sets a movement order of carriage 12 moving from delivery vehicle 60 to the disposition position, based on the above-described selection result (S240). Here, for example, CPU 72 sets the movement order in which carriage 12 moving to the disposition position farther from doorway 32 is moved earlier by giving highest priority. When the movement order is set in this way, it is possible to further suppress a situation in which carriage 12 is disposed earlier in the vicinity of doorway 32 to obstruct the movement of another carriage 12. In addition, when the movement order is set, CPU 72 sets the movement order in which carriage 12 whose movement is obstructed by the disposition of another carriage 12 is moved earlier by giving priority to another carriage 12. When the movement order is set in this way, the movement of carriage 12 can be prevented from being obstructed, and carriage 12 can be more reliably moved to the disposition position. In addition, CPU 72 sets the movement order in which carriage 12 assigned to the worker who enters shop 30 earlier is moved earlier by giving priority next time. For example, CPU 72 gives higher priority to a movement of carriage 12i assigned to the worker than carriage 12c left in front of display shelf 31c. When the movement order is set in this way, the article can be smoothly moved to display shelf 31.

After the movement order is set in S240, CPU 72 sets a movement path of carriage 12 from delivery vehicle 60 to the disposition position, based on the movement order on which the selection result is reflected (S250). In this case, CPU 72 sets the movement path by determining that carriage 12 moved to the disposition position earlier is non-movable region 16. In addition, CPU 72 may set the movement path from delivery vehicle 60 to the disposition position to have a shortest distance as much as possible. For example, the movement path can be defined by coordinates of multiple passing points through which carriage 12 passes. Since CPU 72 can recognize a region of carriage 12 disposed earlier in accordance with the movement order, CPU 72 can set the movement path by considering a non-movable region of carriage 12.

Next, CPU 72 sets an arrangement order when carriages 12 are loaded on delivery vehicle 60, based on the above-described movement order (S260). CPU 72 may set the arrangement order to be opposite to the movement order. For example, carriage 12 having the first movement order may have the last arrangement order. CPU 72 may set the arrangement order by using the movement order and by indirectly using correspondence information 75 or layout information 76. CPU 72 sets the arrangement order of carriages 12 by considering the set movement order of carriages 12. In this case, CPU 72 sets the arrangement order in which carriage 12 moving from doorway 32 to the closer disposition position is loaded earlier on delivery vehicle 60 by giving highest priority. That is, CPU 72 sets the arrangement order of carriages 12 so that carriage 12 located at the disposition position farther from doorway 32 of shop 30 tends to be closer to the doorway (tail gate 62) of cargo chamber 61 of delivery vehicle 60. When the arrangement order is set in this way, since carriage 12 disposed in the vicinity of doorway 32 of shop 30 is carried out later from delivery vehicle 60, the movement of another carriage 12 is unlikely to be obstructed. In addition, when there is carriage 12 whose movement is obstructed by the disposition of another carriage 12, CPU 72 sets the arrangement order in which another carriage 12 is loaded earlier on delivery vehicle 60 by giving higher priority. CPU 72 sets the arrangement order of carriages 12 by considering the set movement path of carriage 12. When the arrangement order is set in this way, carriage 12 can be more reliably moved to the disposition position by carrying out carriage 12 obstructing the movement of another carriage 12 later. In addition, CPU 72 sets the arrangement order in which carriage 12 assigned to the worker who enters shop 30 earlier is loaded later on delivery vehicle 60. For example, since CPU 72 can carry out carriage 12 assigned to the worker earlier from delivery vehicle 60 than carriage 12 left in front of display shelf 31, the article can be smoothly moved to display shelf 31.

After S260, CPU 72 adds the set movement order to correspondence information 75 as movement order information 75*a*, and stores and adds the set arrangement order to correspondence information 75 as arrangement order information 75*b* (S270). Subsequently, CPU 72 transmits updated correspondence information 75 to logistics PC 21 and shop PC 26 (S280). Logistics PC 21 receiving updated correspondence information 75 uses arrangement order information 75*b* as an order for loading carriages 12 on delivery vehicle 60. Automatic movement device 40 located in logistics center 20 loads corresponding carriage 12 on delivery vehicle 60 in accordance with the order of arrangement order information 75*b*. When carriage 12 to be loaded is not in the collection region, since a current position of carriage 12 is transmitted from display plate 80 to logistics PC 21, automatic movement device 40 can further suppress a possibility that the loading of carriage 12 on delivery vehicle 60 may be left behind. In addition, shop PC 26, movement order information 75*a* is used as the movement order in which carriages 12 unloaded from delivery vehicle 60 are moved into shop 30. Automatic movement device 40 located in shop 30 moves corresponding carriage 12 from delivery vehicle 60 to the disposition position in accordance with the order of movement order information 75*a*. The worker of shop 30 carries out work for moving the article loaded on carriage 12 to display shelf 31. CPU 72 determines whether the movement order, the movement path, and the arrangement order of carriages 12 are all set, and when all are not set, CPU 72 repeatedly performs the processes subsequent to S200. On the other hand, when all of the movement order, the movement path, and the arrangement order of carriages 12 are set, the routine is completed.

Figure 10:
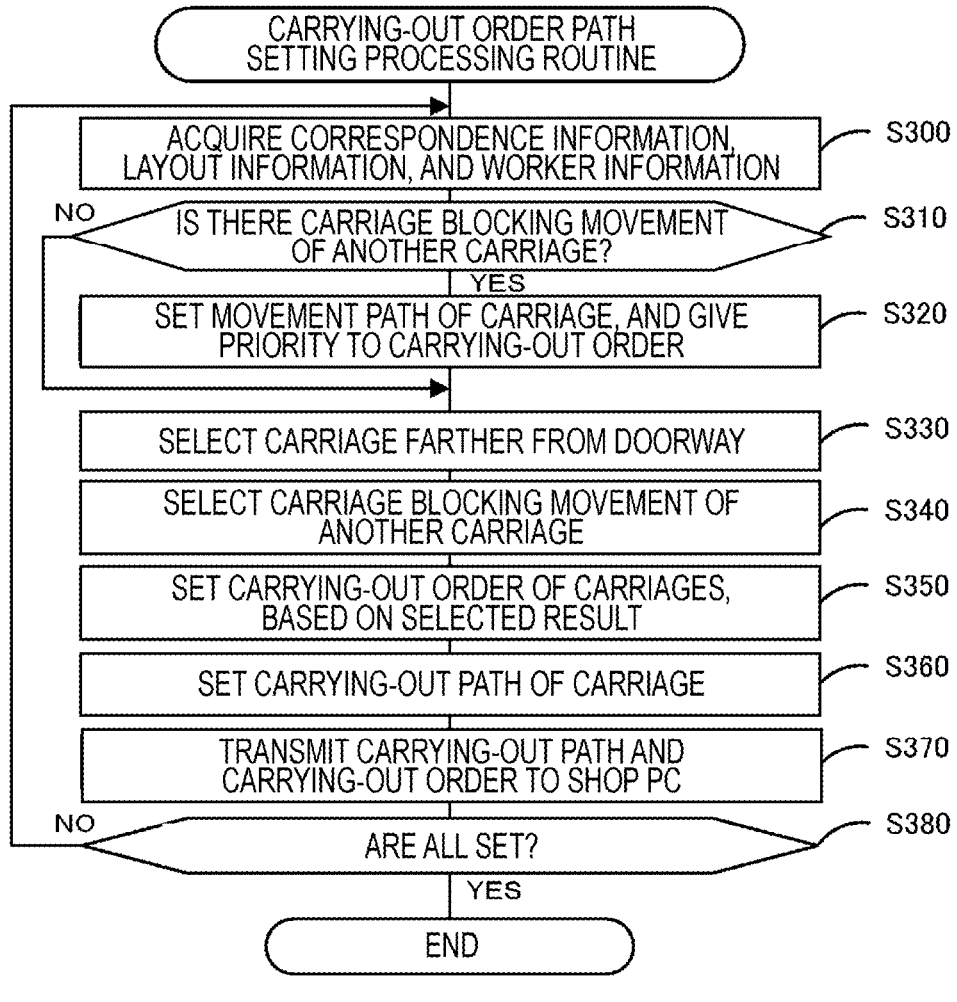
FIG. 10 is a flowchart illustrating an example of a carrying-out order path setting processing routine.

Next, processing of setting the order in which empty carriages 12 are carried out from shop 30 after the articles are displayed on display shelf 31 in shop 30 will be described. FIG. 10 is a flowchart illustrating an example of a carrying-out order path setting processing routine performed by CPU 72 of management server 70. The routine is stored in storage section 73 of control device 71, and is performed after the order path setting processing routine is performed. When the routine starts, CPU 72 of control device 71 reads and acquires correspondence information 75, layout information 76, and work schedule information 77 from storage section 73 (S300). Next, CPU 72 determines whether any one of empty carriages 12 from which the articles are transported and located at the disposition position in front of display shelf 31 obstructs the movement of carriage 12 to be carried in next (S310). For example, CPU 72 may read a subsequent carrying-in schedule included in delivery schedule information 78, and may determine the loading schedule. When there is empty carriage 12 obstructing the movement of carriage 12 to be carried in next, CPU 72 sets a carrying-out path in which empty carriage 12 from which the articles are transported is carried out earlier from shop 30, and performs the process by giving priority to the carrying-out order of empty carriage 12 (S320).

After S320 or when any one of empty carriages 12 does not obstruct the movement of carriage 12 to be carried in next in S310, CPU 72 sets the carrying-out order of other empty carriages 12. Specifically, CPU 72 selects carriage 12 closer to doorway 32 of shop 30 out of empty carriages 12 located in front of display shelf 31 (S330). Next, CPU 72 selects empty carriage 12 obstructing the movement of another carriage 12 (S340). Subsequently, CPU 72 sets the carrying-out order in which carriages 12 are carried out from shop 30, based on the above-described selection result (S350). Here, for example, CPU 72 sets the carrying-out order by giving highest priority to carriage 12 selected in S310, in subsequent priority to empty carriage 12 closer to doorway 32, and in subsequent priority to carriage 12 obstructing the movement of another carriages 12. When the carrying-out order is set in this way, carriage 12 can be smoothly carried out.

Subsequently, CPU 72 sets a carrying-out path of carriage 12, based on the carrying-out order (S360). The carrying out path can be set by using the same method as that of the above-described movement path. CPU 72 transmits the set carrying-out path and the set carrying-out order to shop PC 26 (S370), determines whether all of the carrying-out order and the carrying-out path of carriage 12 are set, and repeatedly performs the processes subsequent to S300, when all are not set. On the other hand, when all of the carrying-out order and the carrying-out path of empty carriage 12 are set, the routine is completed. Logistics PC 21 receiving the carrying-out order and the carrying-out path of empty carriage 12 moves the article from carriage 12, and empty carriage 12 can be smoothly moved outward of shop 30 by automatic movement device 40.

Here, a correspondence between configuration elements of the present embodiment and configuration elements according to the present disclosure will be clarified. Logistics center 20 and shop 30 of the present embodiment correspond to an accommodation chamber, carriage 12 corresponds to a carriage, and delivery system 10 corresponds to a delivery system. In addition, control device 71, control device 22, and control device 27 correspond to a control device, CPU 72 corresponds to a management control section, and storage section 73 corresponds to a storage section. In addition, correspondence information 75 corresponds to correspondence information, layout information 76 corresponds to layout information, work schedule information 77 corresponds to work schedule information, the article ID corresponds to identification information on an article, and the carriage ID corresponds to identification information on a carriage. In addition, delivery vehicle 60 corresponds to a transporter, logistics center 20 and shop 30 correspond to an accommodation chamber, cargo chamber 61 corresponds to a cargo chamber, movable region 15 corresponds to a movable region, and non-movable region 16 corresponds to a non-movable region. In addition, display plate 80 corresponds to a display plate, display section 84 corresponds to a display section, and communication section 85 corresponds to an acquisition section and a transmission section. In the present embodiment, an example of the control method according to the present disclosure is also clarified by describing an operation of delivery system 10.

In control device 71 of the present embodiment described above, the movement of the article is managed by using correspondence information 75 in which the article ID, the carriage ID of carriage 12 on which the article is loaded, and the information on the disposition position of carriage 12 disposed in shop 30 serving as the accommodation chamber are associated with each other. In control device 71, since the article, the carriage, and the disposition position are managed in association with each other, the delivery work of the article can be more efficiently carried out. In addition, storage section 73 stores layout information 76 of shop 30 including movable region 15 of carriage 12, and CPU 72 sets the movement path of carriage 12 inside shop 30 by using correspondence information 75 and layout information 76. Since layout information 76 including movable region 15 of carriage 12 is used, control device 71 can more efficiently carry out the delivery work of the article by setting an efficient movement path of carriage 12. Furthermore, control device 71 sets the movement path by considering a disposition state of carriage 12 moved from delivery vehicle 60 and disposed in shop 30. Since control device 71 considers the disposition state of disposed carriage 12, the movement of carriage 12 is unlikely to be obstructed by disposed carriage 12.

In addition, storage section 73 stores work schedule information 77 of the worker who carries out work for taking out the article from carriage 12 in shop 30, and CPU 72 sets the movement order of carriage 12 by considering the schedule of the worker who carries out the work in shop 30 by using work schedule information 77. Since control device 71 sets the movement order of the carriage by considering the schedule of the worker, the articles can be more efficiently unloaded from the carriage by using the schedule of the worker. In addition, CPU 72 sets the movement order in which carriage 12 assigned to work of the worker who enters shop 30 earlier is moved to the disposition position by giving higher priority by using work schedule information 77. In control device 71, since carriage 12 assigned to work of the worker who enters shop 30 earlier can be prepared earlier, the articles can be more efficiently unloaded from the carriage more efficiently. Furthermore, when carriage 12 is moved and disposed to the disposition position of shop 30 and the movement of another carriage 12 is obstructed, CPU 72 sets the movement order of carriage 12 to be moved to the disposition position by giving priority to another carriage 12 whose movement is obstructed. Control device 71 can further suppress a possibility that the movement of carriage 12 may be obstructed by the presence of another carriage 12, and the delivery work of the article can be more efficiently carried out. Furthermore, when empty carriage 12 from which the article is transported from carriage 12 disposed at the disposition position of the article obstructs the movement of carriage 12 to be carried in next, CPU 72 sets the carrying-out path for carrying out empty carriage 12 from the accommodation chamber. Control device 71 can further suppress a possibility that unloaded carriage 12 may obstruct the movement of carriage 12 to be carried in, and the delivery work of the article can be more efficiently carried out.

Furthermore, CPU 72 sets the arrangement order of carriages 12 in cargo chamber 61 of delivery vehicle 60 by using correspondence information 75 and layout information 76. Control device 71 can further suppress a possibility that the movement of carriage 12 may be obstructed by the presence of another carriage 12 when carriage 12 is transported from cargo chamber 61, by using the arrangement order of the carriages to be aligned in cargo chamber 61 of delivery vehicle 60. In addition, CPU 72 sets the arrangement order of carriages 12 so that carriage 12 located at the disposition position farther from doorway 32 of shop 30 tends to be closer to the doorway of cargo chamber 61 of delivery vehicle 60. Since control device 71 moves carriage 12 having a longer movement distance earlier from cargo chamber 61, the delivery work of the article can be more efficiently carried out by further suppressing congestion of carriages 12 in doorway 32. In addition, CPU 72 sets the arrangement order of carriages 12 by considering the set movement path of carriages 12 and the set carriage movement order. Control device 71 can set the arrangement order of carriages 12 in cargo chamber 61 of delivery vehicle 60 by using the movement path and the movement order of carriages 12 in shop 30.

Furthermore, CPU 72 sets the arrangement order of carriages 12 by considering the disposition state of carriages 12 moved from delivery vehicle 60 and disposed in shop 30. In addition, CPU 72 sets the arrangement order of carriages 12 by considering the schedule of the worker who carries out the work in shop 30 by using work schedule information 77. In addition, CPU 72 uses work schedule information 77 to set the arrangement order of the carriage close to the doorway of cargo chamber 61 by giving priority to the carriage assigned to work of the worker who enters shop 30 earlier. In addition, when carriage 12 is moved to and disposed at the disposition position of shop 30 and the movement of another carriage 12 is obstructed, CPU 72 sets the arrangement order of carriage 12 disposed at a position closer to the doorway of cargo chamber 61 by giving priority to another carriage 12 whose movement is obstructed.

In addition, since carriage 12 on which the article is loaded is moved by automatic movement device 40 automatically moving inside logistics center 20 or inside shop 30, delivery system 10 can autonomously, more efficiently, and smoothly move the article.

In addition, RFID 18 serving as identification information on carriage 12 is formed in carriage 12, display plate 80 having display section 84 for displaying the delivery destination and communication section 85 for acquiring the carriage ID in a contactless manner and transmitting the acquired carriage ID to control device 71 is detachably disposed in carriage 12, and CPU 72 receives the information transmitted by communication section 85. Control device 71 can more easily generate correspondence information 75 by using display plate 80 for automatically acquiring the carriage ID. Therefore, control device 71 can more efficiently carry out the delivery work of the article by using correspondence information 75. In addition, communication section 85 further transmits the current position of display plate 80 to control device 71, and CPU 72 receives the current position transmitted by communication section 85. Since control device 71 can recognize the position of carriage 2 by using display plate 80, control device 71 easily manages the movement of the article. Furthermore, when display plate 80 is detached from carriage 12, communication section 85 transmits loading completion information on the article to logistics PC 21, and logistics PC 21 permits the delivery of carriage 12 when the loading completion information is received. In display plate 80, a state of carriage 12 can be recognized by using the detachment of the display plate as a trigger, and the movement of the article is easily managed.

As a matter of course, the present disclosure is not limited to the above-described embodiment in any way, and thus, the present disclosure can be embodied in various aspects without departing from the technical scope according to the present disclosure.

For example, in the above-described embodiment, although the movement path of carriage 12 inside the accommodation chamber is set by using correspondence information 75 and layout information 76, the configuration is not particularly limited to this, and layout information 76 may not be used, or the movement path of carriage 12 may not be set. Control device 71 can also manage carriage 12 by using correspondence information 75.

In the above-described embodiment, although the movement path of carriage 12 is set by considering the disposition state of carriage 12 disposed in the accommodation chamber, for example, this process may be omitted by disposing carriage 12 from a location farthest from doorway 32 so that disposed carriage 12 does not interfere with the disposition of carriage 12 to be disposed later. Control device 71 can also more efficiently carry out the delivery work of the article.

In the above-described embodiment, although the movement order of carriage 12 is set by considering the schedule of the worker who works inside the accommodation chamber by using work schedule information 77, the configuration is not particularly limited to this, and this process may be omitted. Control device 71 can also more efficiently carry out the delivery work of the article by using correspondence information 75. In addition, although control device 71 sets the movement order for moving to the disposition position by giving higher priority to carriage 12 assigned to work of the worker who enters the accommodation chamber earlier, the configuration is not particularly limited, and a priority order thereof may be changed. Control device 71 can also more efficiently carry out the delivery work of the article by using correspondence information 75.

In the above-described embodiment, although a case where movement order information 75a and arrangement order information 75b are included in correspondence information 75 has been described, the configuration is not particularly limited to this, and movement order information 75a and arrangement order information 75b may be used as single information, or may be included in other information such as delivery schedule information 78.

In the above-described embodiment, although when the movement of another carriage 12 is obstructed when carriage 12 is moved and disposed at the disposition position of the accommodation chamber, the movement order of the carriage to be moved to the disposition position is set by giving priority to other carriage 12 whose movement is obstructed, the configuration is not particularly limited to this, and this process may be omitted. Control device 71 can also more efficiently carry out the delivery work of the article by using correspondence information 75.

In the above-described embodiment, when the movement of carriage 12 to be carried in next is obstructed, the carrying-out path in which the empty carriage 12 from which the article is transported is carried out from the accommodation chamber is set, the configuration is not particularly limited to this, and this process may be omitted. Control device 71 can also more efficiently carry out the delivery work of the article by using correspondence information 75.

In the above-described embodiment, although control device 71 sets the arrangement order of carriages 12 in cargo chamber 61 of delivery vehicle 60 serving as the transporter, the configuration is not particularly limited to this, and the setting of the arrangement order may be omitted. Control device 71 can also more efficiently carry out the delivery work of the article by using correspondence information 75. Since the arrangement order corresponds to the order when carriages 12 are unloaded from cargo chamber 61, it is preferable that control device 71 sets the arrangement order.

In the above-described embodiment, although the arrangement order of carriages 12 is set so that carriage 12 located at the disposition position farther from the doorway of the accommodation chamber tends to be closer to the doorway of the cargo chamber of the transporter, the configuration is not particularly limited to this. Control device 71 may adopt a priority order of the other arrangement orders. In addition, although control device 71 sets the arrangement order of carriages 12 by considering at least one of the set movement path of carriage 12 and the set movement order of carriage 12, the configuration is not particularly limited to this, any one may be omitted, or both may be omitted. It is preferable that control device 71 considers at least one of the movement path and the movement order of carriage 12.

In the above-described embodiment, although communication section 85 acquires the carriage ID from RFID 18 through radio waves by using display plate 80, the configuration is not particularly limited to this, and the carriage ID may be acquired by a barcode via a reader capable of reading the barcode, or the carriage ID may be acquired via a camera for capturing an image.

In the above-described embodiment, although display plate 80 has display section 84 serving as a display for displaying and outputting information on a delivery destination by using an image, a symbol, or a character, and information on the delivery destination is displayed on display section 84, the configuration is not particularly limited to this, and for example, a plate for handwriting the information on the delivery destination may be used.

In the above-described embodiment, although display plate 80 transmits the current position, this configuration may be omitted. The configuration of display plate 80 can be further simplified. In addition, although in display plate 80, communication section 85 communicates with the external device and acquires the carriage ID from RFID 18, a receiving device other than communication section 85 may be provided, and the carriage ID may be acquired by a device other than communication section 85.

In the above-described embodiment, although display plate 80 transmits information to logistics PC 21 when attached to carriage 12 or detached from carriage 12, the configuration is not particularly limited to this, and the worker may input loading completion of the article to display plate 80, the worker may input delivery preparation completion of carriage 12 to display plate 80, or display plate 80 may transmit relevant information to logistics PC 21. Alternatively, display plate 80 may omit information transmission when attached to carriage 12 or detached from carriage 12.

In the above-described embodiment, although not specifically described, a gate for acquiring the carriage ID may be provided in logistics center 20, delivery vehicle 60, or shop 30, and carriage 12 may be managed by using the carriage ID acquired from the gate. The carriage ID may be directly acquired by the gate from RFID 18, or may be acquired via display plate 80. In delivery system 10, carriage 12 can be managed in more detail. Here, the gate may acquire the carriage ID when carriage 12 is loaded on delivery vehicle 60, may acquire the carriage ID when carriage 12 is unloaded in shop 30, or may acquire the carriage ID in logistics center 20 when carriage 12 is returned. In this case, delivery system 10 can manage whether carriage 12 is located at any location by using the carriage ID.

In the above-described embodiment, although automatic movement device 40 includes mecanum wheel 45 and is movable in an endless manner, the configuration is not particularly limited to this as long as automatic movement device 40 has a configuration capable of traveling. Automatic movement device 40 may have a normal wheel. In this case, automatic movement device 40 may include four wheels, three wheels, or may include two main wheels and one or more sub wheels.

In the above-described embodiment, although a case where carriage 12 is automatically moved by using automatic movement device 40 has been described, the configuration is not particularly limited to this, and carriage 12 may be moved by the worker. Control device 71 can also more efficiently carry out the delivery work of the article by using correspondence information 75.

In the above-described embodiment, although a case where carriage 12 and display shelf 31 are set as non-movable region 16 has been described, the configuration is not particularly limited to this as long as carriage 12 is a non-movable region. In the above-described embodiment, although a case where the article is moved to display shelf 31 of shop 30 has been described, the configuration is not particularly limited to this as long as the disposition position of carriage 12 is determined as the delivery destination. For example, a position in front of multiple devices forming a manufacturing line disposed in a factory may be the disposition position of carriage 12 in the delivery destination. In this case, the device on the manufacturing line corresponds to non-movable region 16.

In the above-described embodiment, although management server 70 has a function of the control device according to the present disclosure, manages correspondence information 75, and sets the movement order, the movement path, the arrangement order, the carrying-out order, and the carrying-out path of carriage 12, the configuration is not particularly limited to this, and for example, control device 22 of logistics PC 21 or control device 27 of shop PC 26 may have this function, or this function may be distributed to any two or more of control device 71, control device 22, and control device 27.

In the above-described embodiment, although a case where display plate 80 is disposed in carriage 12 has been described, the configuration is not particularly limited to this, and display plate 80 may be omitted. Even in this case, delivery system 10 can efficiently carry out the delivery work of the article by using correspondence information 75.

In the above-described embodiments, although the present disclosure has been described as delivery system 10 or control device 71, the configuration is not particularly limited to this, and the present disclosure may be a control method used in the delivery system. In addition, although the present embodiment has been described as delivery system 10, the configuration is not particularly limited to this, and display plate 80 may be used.

Here, the present disclosure may be configured as follows. For example, in the control device according to the present disclosure, the storage section may store layout information on the accommodation chamber including a movable region of the carriage, and the management control section may set a movement path of the carriage inside the accommodation chamber by using the correspondence information and the layout information. Since the layout information on the accommodation chamber including the movable region of the carriage, the control device can more efficiently carry out the delivery work of the article by setting an efficient movement path of the carriage. Here, in addition to the movable region, the layout information may include a non-movable region of the carriage in the accommodation chamber or a carriage region in which other carriages are disposed.

In the control device according to the present disclosure in an aspect in which the layout information is used, the management control section may set the movement path by considering a disposition state of the carriage moved from the transporter and disposed in the accommodation chamber. Since the control device considers the disposition state of the disposed carriage, the movement of the carriage is unlikely to be obstructed by the disposed carriage.

In the control device according to the present disclosure, the storage section may store work schedule information on a worker who carries out work for taking the article out from the carriage in the accommodation chamber, and the management control section may set a movement order of the carriage by considering a schedule of the worker who carries out the work inside the accommodation chamber by using the work schedule information. Since the control device sets the movement order of the carriages by considering the schedule of the worker, the control device can more efficiently unload the article from the carriages by using the schedule of the worker.

In the control device of the present disclosure in an aspect in which the work schedule information is used, the management control section may set the movement order for moving the carriage to the disposition position by giving higher priority to the carriage assigned to work of the worker who enters the accommodation chamber earlier by using the work schedule information. In the control device, since the carriage assigned to work of the worker who enters the inside of the accommodation chamber earlier can be prepared earlier, the articles can be more efficiently unloaded from the carriage.

In the control device according to the present disclosure, when a movement of another carriage is obstructed when the carriage is moved to and disposed at the disposition position of the accommodation chamber, the management control section may set a movement order of the carriage to be moved to the disposition position by giving priority to the other carriage whose movement is obstructed. The control device can further suppress a possibility that the movement of the carriage may be obstructed by the presence of another carriage, and can more efficiently carry out the delivery work of the article.

In the control device according to the present disclosure, when a movement of a carriage to be carried in next is obstructed in the carriage in which the article is transported from the carriage disposed at the disposition position of the article, the management control section may set a carrying-out path for carrying out the carriage in which the article is transported from the accommodation chamber. The control device can further suppress a possibility that the unloaded carriage may obstruct the movement of the carriage to be carried in, and can more efficiently carry out the delivery work of the article.

In the control device according to the present disclosure, the storage section may store layout information on the accommodation chamber including a movable region of the carriage, and the management control section may set an arrangement order of the carriage in the cargo chamber of the transporter by using the correspondence information and the layout information. The control device can further suppress a possibility that the movement of the carriage may be obstructed by the presence of another carriage when the carriage is transported from the cargo chamber, by using the arrangement order of the carriages to be aligned in the cargo chamber of the transporter.

In the control device according to the present disclosure in an aspect in which the arrangement order is set, the management control section may set the arrangement order of the carriage such that a carriage at a disposition position farther from a doorway of the accommodation chamber tends to be closer to a doorway of the cargo chamber of the transporter. Since the carriage having a longer movement distance is moved earlier, the control device can more efficiently carry out the delivery work of the article by further suppressing congestion of the carriages in the doorway. Here, the expression "tends to be closer" means that some exceptions are allowed even when there are some exceptions in which the carriage located at the disposition position farther from the doorway is not closer to the doorway of the cargo chamber, and generally indicates that the carriage located at the disposition position farther from the doorway tends to be closer to the doorway of the cargo chamber.

In the control device according to the present disclosure in an aspect in which the arrangement order is set, the management control section may set the arrangement order of the carriage by considering at least one of the set movement path of the carriage and a movement order of the carriage. The control device can set the arrangement order of the carriage in the cargo chamber of the transporter by using the movement path and the movement order of the carriage in the accommodation chamber. In this case, for example, the management control section may set the arrangement order of the carriage by considering a disposition state of the carriage moved from the transporter and disposed in the accommodation chamber. In addition, the storage section may store work schedule information on a worker who carries out work for taking the article out from the carriage in the accommodation chamber, and the management control section may set the arrangement order of the carriage by considering the schedule of the worker who works inside the accommodation chamber by using the work schedule information. In addition, the management control section may set the arrangement order of the carriage close to the doorway by giving priority to the carriage assigned to work of the worker who enters accommodation chamber earlier by using the work schedule information. In addition, when a movement of another carriage is obstructed when the carriage is moved to and disposed at the disposition position of the accommodation chamber, the management control section may set the arrangement order of the carriage disposed at a position closer to the doorway of the cargo chamber by giving priority to the other carriage whose movement is obstructed.

In the control device according to the present disclosure, the delivery system may include an automatic movement device that at least automatically moves the carriage on which the article is loaded inside the accommodation chamber, the management control section may output the set information to the automatic movement device, and the automatic movement device may automatically move inside the accommodation chamber by using the input information. In the control device, since the automatic movement device executes the set information, the automatic movement device can autonomously, more efficiently, and smoothly move the article. Here, the "automatic movement device" may be an automatic guided vehicle (AGV) that moves on a predetermined traveling road, or may be an autonomous mobile robot (AMR) that moves on a free route by sensing surroundings.

In the control device according to the present disclosure, identification information on the carriage may be formed in the carriage, a display plate having a display section that displays the accommodation chamber of the delivery destination, an acquisition section that acquires the identification information on the carriage in a contactless manner, and a transmission section that transmits the identification information acquired by the acquisition section to the control device may be detachably disposed in the carriage, and the management control section may receive information transmitted by the transmission section. In the control device, the correspondence information can be more easily generated by using the display plate that automatically acquires the identification information. Therefore, in the control method, the delivery work of the article can be more efficiently carried out by using the correspondence information. Here, the display section may be a plate for handwriting the information on the delivery destination, or may be a display for displaying and outputting the information on the delivery destination with an image, a symbol, or a character. In addition, for example, the identification information on the carriage may be a two-dimensional barcode, or may be an RFID capable of outputting information on the RF tag by using radio waves. In addition, the acquisition section may be a reader capable of reading a barcode, or may be a camera for capturing an image.

In the control device of the present disclosure in an aspect having the display plate, the transmission section may further transmit a current position of the display plate to the control device, and the management control section may receive the current position transmitted by the transmission section. Since the control device can recognize the position of the carriage by using the display plate, the movement of the article is easily managed.

In the control device of the present disclosure in an aspect having the display plate, the transmission section may transmit loading completion information on the article to the control device when the display plate is detached from the carriage, and the management control section may permit a delivery of the carriage when the loading completion information is received. In the control device, a state of the carriage can be recognized by using the detachment of the display plate as a trigger, and the movement of the article is easily managed.

According to the present disclosure, there is provided a delivery system that uses a transporter for accommodating a carriage on which an article is loaded in a cargo chamber and delivering the carriage to deliver the article to an accommodation chamber in which multiple carriages are disposed, the delivery system including the management device including any one of the above-described control devices; and an automatic movement device configured to automatically move the carriage on which the article is loaded at least inside the accommodation chamber.

In the delivery system, since the automatic movement device can autonomously move the carriage by using the information set by any one of the above-described control devices, the delivery system can more efficiently carry out the delivery work of the article.

According to the present disclosure, there is provided a control method used in a delivery system that uses a transporter for accommodating a carriage on which an article is loaded in a cargo chamber and delivering the carriage to deliver the article to an accommodation chamber in which multiple carriages are disposed, the control method including a step of setting a movement path of the carriage inside the accommodation chamber by using correspondence information in which identification information on the article, identification information on the carriage on which the article is loaded, and information on a disposition position of the carriage disposed in the accommodation chamber are associated with each other, and layout information on the accommodation chamber including a movable region of the carriage.

In the control method, as in the above-described control device, the delivery work of the article can be more efficiently carried out by setting an efficient movement path of the carriage. In the control method, various aspects of the above-described control device may be adopted, or steps for realizing each function of the above-described control device may be added.

According to the present disclosure, there is provided a display plate used in a delivery system that has a control device including a management control section configured to manage a movement of an article, and that uses a carriage on which the article is loaded and in which identification information is formed to deliver the article to an accommodation chamber of a delivery destination from a collection chamber in which multiple carriages are collected, the display plate including a display section that displays the accommodation chamber of the delivery destination; an acquisition section that acquires the identification information on the carriage in a contactless manner; and a transmission section that transmits the identification information acquired by the acquisition section to the control device.

The display plate automatically acquires the identification information on the carriage, and transmits the identification information on the carriage to the control device. In the control device acquiring the identification information, for example, the article, the carriage, and the disposition position of the accommodation chamber can be associated with each other. Therefore, since the display plate can acquire the identification information on the carriage by attaching the display plate to the carriage, the works of the worker can be further reduced, and the delivery work of the article can be more efficiently carried out. Here, the display section may be a plate for handwriting the information on the delivery destination, or may be a display for displaying and outputting the information on the delivery destination with an image, a symbol, or a character. In addition, for example, the identification information on the carriage may be a two-dimensional barcode, or may be an RFID capable of outputting information on the RF tag by using radio waves. In addition, the acquisition section may be a reader capable of reading a barcode, or may be a camera for capturing an image.

In the display plate according to the present disclosure, the transmission section may further transmit a current position of the display plate to the control device. In the display plate, since the position of the carriage can be recognized by using the display plate, the movement of the article is easily managed.

In the display plate according to the present disclosure, the transmission section may transmit loading completion information on the article to the control device when the display plate is detached from the carriage. In the display plate, a state of the carriage can be recognized by using the detachment of the display plate as a trigger, and the movement of the article is easily managed.

INDUSTRIAL APPLICABILITY

The control device, the delivery system, the control method, and the display plate according to the present disclosure can be used in a technical field of a commodity logistics system for delivering commodities.

REFERENCE SIGNS LIST

10 Delivery system, 11 Network, 12, 12a to 12c, 12e, 12i Carriage, 13 Loading section, 14 Caster, 15 Movable region, 16 Non-movable region, 18 RFID, 20 Logistics center, 21 Logistics PC, 22 Control device, 23 Storage section, 24 Communication section, 26 Shop PC, 27 Control device, 28 Storage section, 29 Communication section, 30 Shop, 31, 31a to 31j Display shelf, 32 Doorway, 40 Automatic movement device, 41 Movement control section, 42 Storage section, 43 Vehicle body part, 44 Lift portion, 45 Mecanum wheel, 46 Movement driving section, 47 Detection sensor, 48 Communication section, 59 Display shelf, 60 Delivery vehicle, 61 Cargo chamber, 62 Tail gate, 63 Tail lift, 70 Management server, 71 Control device, 72 CPU, 73 Storage section, 74 Communication section, 75 Correspondence information, 75a Movement order information, 75b Arrangement order information, 76 Layout information, 77 Work schedule information, 78 Delivery schedule information, 80 Display plate, 81 Control section, 83 Storage section, 84 Display section, 85 Communication section

The invention claimed is:

1. A control device used in a delivery system that uses a transporter for accommodating a carriage on which an article is loaded in a cargo chamber and delivering the carriage to deliver the article to an accommodation chamber in which multiple carriages are disposed, the control device comprising:

a storage section configured to store correspondence information in which identification information on the article, identification information on the carriage on which the article is loaded, and information on a disposition position of the carriage disposed in the accommodation chamber are associated with each other; and a management control section configured to manage a movement of the article by using the correspondence information, wherein the storage section stores layout information on the accommodation chamber including a movable region of the carriage, and the management control section sets a movement path of the carriage inside the accommodation chamber by using the correspondence information and the layout information.

2. The control device according to claim 1, wherein the management control section sets the movement path by considering a disposition state of the carriage moved from the transporter and disposed in the accommodation chamber.

3. The control device according to claim 1, wherein the storage section stores work schedule information on a worker who carries out work for taking the article out from the carriage in the accommodation chamber, and the management control section sets a movement order of the carriage by considering a schedule of the worker who carries out the work inside the accommodation chamber by using the work schedule information.

4. The control device according to claim 3, wherein the management control section sets the movement order for moving the carriage to the disposition position by giving higher priority to the carriage assigned to work of the worker who enters the accommodation chamber earlier by using the work schedule information.

5. The control device according to claim 1, wherein when a movement of another carriage is obstructed when the carriage is moved to and disposed at the disposition position of the accommodation chamber, the management control section sets a movement order of the carriage to be moved to the disposition position by giving priority to the other carriage whose movement is obstructed.

6. The control device according to claim 1, wherein when a movement of a carriage to be carried in next is obstructed in the carriage in which the article is transported from the carriage disposed at the disposition position of the article, the management control section sets a carrying-out path for carrying out the carriage in which the article is transported from the accommodation chamber.

7. The control device according to claim 1, wherein the storage section stores the layout information on the accommodation chamber including a movable region of the carriage, and the management control section sets an arrangement order of the carriage in the cargo chamber of the transporter by using the correspondence information and the layout information.

8. The control device according to claim 7, wherein the management control section sets the arrangement order of the carriage such that a carriage at a disposition position farther from a doorway of the accommodation chamber tends to be closer to a doorway of the cargo chamber of the transporter.

9. The control device according to claim 7, wherein the management control section sets the arrangement order of the carriage by considering at least one of the set movement path of the carriage and a movement order of the carriage.

10. The control device according to claim 1, wherein the delivery system includes an automatic movement device that at least automatically moves the carriage on which the article is loaded inside the accommodation chamber, the management control section outputs set information to the automatic movement device, and the automatic movement device automatically moves inside the accommodation chamber by using the set information.

11. The control device according to claim 1, wherein the identification information on the carriage is formed in the carriage, a display plate having a display section that displays the accommodation chamber of a delivery destination, an acquisition section that acquires the identification information on the carriage in a contactless manner, and a transmission section that transmits the identification information acquired by the acquisition section to the control device is detachably disposed in the carriage, and the management control section receives information transmitted by the transmission section.

12. The control device according to claim 11, wherein the transmission section further transmits a current position of the display plate to the control device, and the management control section receives the current position transmitted by the transmission section.

13. The control device according to claim 11, wherein the transmission section transmits loading completion information on the article to the control device when the display plate is detached from the carriage, and the management control section permits a delivery of the carriage when the loading completion information is received.

14. A delivery system that uses a transporter for accommodating a carriage on which an article is loaded in a cargo chamber and delivering the carriage to deliver the article to an accommodation chamber in which multiple carriages are disposed, the delivery system comprising:

a management device including the control device according to claim 1; and an automatic movement device configured to automatically move the carriage on which the article is loaded at least inside the accommodation chamber.

15. A control method used in a delivery system that uses a transporter for accommodating a carriage on which an article is loaded in a cargo chamber and delivering the carriage to deliver the article to an accommodation chamber in which multiple carriages are disposed, the control method comprising:

a step of setting a movement path of the carriage inside the accommodation chamber by using correspondence information in which identification information on the article, identification information on the carriage on which the article is loaded, and information on a disposition position of the carriage disposed in the accommodation chamber are associated with each other, and layout information on the accommodation chamber including a movable region of the carriage; and a step of controlling the transporter to move in accordance with the movement path set in the step of setting.

16. A display plate used in a delivery system that has a control device including a management control section configured to manage a movement of an article, and that uses a carriage on which the article is loaded and in which identification information is formed to deliver the article to an accommodation chamber of a delivery destination from a collection chamber in which multiple carriages are collected, the display plate comprising:

a display section configured to display the accommodation chamber of the delivery destination;

an acquisition section configured to acquire the identification information on the carriage in a contactless manner; and a transmission section configured to transmit the identification information acquired by the acquisition section to the control device.

17. The display plate according to claim 16, wherein the transmission section further transmits a current position of the display plate to the control device.

18. The display plate according to claim 16, wherein the transmission section transmits loading completion information on the article to the control device when the display plate is detached from the carriage.

\* \* \* \* \*